(12) United States Patent
Tabet et al.

(10) Patent No.: US 9,585,068 B2
(45) Date of Patent: Feb. 28, 2017

(54) TRIGGERING CELL TRANSITION IN AN UPLINK POWER LIMITED CONDITION

(71) Applicant: Apple Inc., Cupertino, CA (US)

(72) Inventors: Tarik Tabet, Los Gatos, CA (US); Sarma V. Vangala, San Jose, CA (US); Sreevalsan Vallath, Dublin, CA (US); Swaminathan Balakrishnan, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 9 days.

(21) Appl. No.: 14/049,894

(22) Filed: Oct. 9, 2013

(65) Prior Publication Data

US 2014/0098693 A1    Apr. 10, 2014

Related U.S. Application Data

(60) Provisional application No. 61/712,193, filed on Oct. 10, 2012.

(51) Int. Cl.
*H04W 36/00* (2009.01)
*H04W 52/14* (2009.01)
*H04W 36/06* (2009.01)
*H04W 36/30* (2009.01)

(52) U.S. Cl.
CPC ....... *H04W 36/0083* (2013.01); *H04W 36/06* (2013.01); *H04W 36/30* (2013.01); *H04W 52/14* (2013.01)

(58) Field of Classification Search
None
See application file for complete search history.

(56) References Cited

U.S. PATENT DOCUMENTS

| | | | | |
|---|---|---|---|---|
| 5,862,489 | A * | 1/1999 | Aalto | H04W 52/50 370/331 |
| 6,219,550 | B1 * | 4/2001 | Kanerva | H04W 36/26 455/226.1 |
| 2003/0134655 | A1 * | 7/2003 | Chen et al. | 455/522 |
| 2007/0206631 | A1 * | 9/2007 | Parts et al. | 370/465 |
| 2008/0167089 | A1 * | 7/2008 | Suzuki et al. | 455/574 |
| 2008/0268786 | A1 * | 10/2008 | Baker et al. | 455/67.11 |
| 2009/0323541 | A1 | 12/2009 | Sägfors et al. | |
| 2010/0015984 | A1 * | 1/2010 | Kazmi | 455/437 |
| 2010/0190488 | A1 * | 7/2010 | Jung et al. | 455/424 |
| 2010/0271963 | A1 * | 10/2010 | Koorapaty et al. | 370/252 |

(Continued)

OTHER PUBLICATIONS

PCT Application No. PCT/US2013/064094—International Search Report & Written Opinion dated Jan. 29, 2014.

*Primary Examiner* — Vinncelas Louis
(74) *Attorney, Agent, or Firm* — Downey Brand LLP

(57) ABSTRACT

A method for triggering cell transition in an uplink power limited condition is disclosed. The method can include a wireless communication device determining that the wireless communication device is experiencing an uplink power limited condition; deriving a modified downlink channel quality measurement by adjusting a measured downlink channel quality to indicate a lower downlink channel quality than the measured downlink channel quality; generating a measurement report including the modified downlink channel quality measurement; and sending the measurement report to the serving cell to trigger transition of the wireless communication device from the serving cell to a second cell.

20 Claims, 9 Drawing Sheets

(56) References Cited

U.S. PATENT DOCUMENTS

| | | |
|---|---|---|
| 2010/0273520 A1 | 10/2010 | Pelletier et al. |
| 2010/0285830 A1 | 11/2010 | Englund et al. |
| 2011/0105123 A1* | 5/2011 | Lee et al. ............ 455/436 |
| 2011/0195731 A1 | 8/2011 | Jang et al. |
| 2011/0256834 A1* | 10/2011 | Dayal et al. ........... 455/67.7 |
| 2012/0094672 A1 | 4/2012 | Hunukumbure et al. |
| 2012/0099441 A1* | 4/2012 | Jung et al. ............ 370/242 |
| 2012/0106386 A1 | 5/2012 | Johansson et al. |
| 2012/0252433 A1* | 10/2012 | Martin et al. ......... 455/422.1 |
| 2012/0322447 A1 | 12/2012 | Ramachandran et al. |
| 2013/0045741 A1 | 2/2013 | Martin et al. |
| 2013/0077513 A1* | 3/2013 | Ng et al. ............. 370/252 |
| 2013/0242898 A1* | 9/2013 | Johansson et al. ....... 370/329 |

\* cited by examiner

TRIGGERING CELL TRANSITION IN AN UPLINK POWER LIMITED CONDITION

CROSS-REFERENCE TO RELATED APPLICATIONS

The instant application claims the benefit of U.S. Provisional Patent Application Ser. No. 61/712,193, filed on Oct. 10, 2012, the contents of which are incorporated herein by reference in their entirety.

FIELD OF THE DESCRIBED EMBODIMENTS

The described embodiments relate generally to wireless communication technology, and more particularly to triggering cell transition in an uplink power limited condition.

BACKGROUND

A wireless communication device can encounter uplink (UL) power limited scenarios due to a variety of factors, including various hardware constraints, such as proximity between a device and a human body, as can be measured by a proximity sensor. In this regard, wireless communication devices can be configured with a power class defining a maximum UL transmission power capability of the device. For example, UEs (user equipment devices) categorized as power class 3 UEs on a Long Term Evolution (LTE) network can have a maximum UL transmission power capability of +23 dBm (decibels per milliwatt). However, due to factors, such as Federal Communications Commission (FCC) Specific Absorption Rate (SAR) restrictions, devices are often limited to transmitting at a power lower than the maximum UL transmission power capability when proximate to a human body. Transmission power limitations in this situation can result in a device experiencing an UL power limited condition.

When a wireless communication device experiences an UL power limited condition, the effective coverage area of a serving cell can be reduced. In this regard, a cell can be configured with an effective coverage radius on the basis of a device's power class. Thus in an UL power limited condition, a wireless communication device can be within sufficient range of the serving base station to be able to successfully receive and decode downlink (DL) messages sent to the device, but, due to transmission power limitations, may be unable to successfully send UL messages to the serving base station. In this regard, the UL power limited condition can result in a link imbalance between UL channel quality and DL channel quality in which the UL channel quality is less than the DL channel quality.

Measurement reports triggered on the basis of DL power can be used to trigger a handover decision by a serving base station. However, in the case of a link imbalance in which DL power is within acceptable parameters configured on the basis of a device's power class but the device is experiencing an UL power limited condition limiting the effective coverage area of the cell, the serving base station can be unaware of the device's transmission power limited condition. As such, the serving base station can assume that the wireless communication device remains within the cell coverage area even though the wireless communication device may be outside of the effective coverage range of the cell and unable to successfully transmit UL messages to the serving base station due to the UL power limited condition. Accordingly, the wireless communication device can remain stuck on the serving cell, which can result in data stalls, dropped calls, and/or the like due to the deteriorated UL scenario, thereby degrading user experience.

BRIEF SUMMARY OF SOME DISCLOSED EMBODIMENTS

Some embodiments disclosed herein provide for initiation of a codec rate change by a wireless communication device during a VoIP call, such as a VoLTE call. Some example embodiments disclosed herein provide for triggering cell transition in an UL power limited condition. In this regard, some example embodiments prevent data stalls, call drops, and the like by triggering transition from a serving cell to a second cell in scenarios in which a wireless communication device is limited in accessibility resources due to a power limited condition inhibiting UL communication on the serving cell. More particularly, a wireless communication device in accordance with some example embodiments can be configured to send a measurement report to a serving cell that includes a modified DL channel quality measurement that has been adjusted to reflect a lower DL channel quality than a DL quality actually measured by the device so as to trigger reselection from the serving cell to a second cell in situations in which it has limited UL resources. Accordingly, a transition to a cell that may provide increased UL resources to the wireless communication device can be triggered preemptively before a data stall occurs in an UL power limited condition, thereby improving user experience.

In a first example embodiment, a method for triggering cell transition in an UL power limited condition is provided. The method can include a wireless communication device determining that the wireless communication device is experiencing an uplink power limited condition; deriving a modified downlink channel quality measurement by adjusting a measured downlink channel quality to indicate a lower downlink channel quality than the measured downlink channel quality; generating a measurement report including the modified downlink channel quality measurement; and sending the measurement report to the serving cell to trigger transition of the wireless communication device from the serving cell to a second cell.

In a second example embodiment, a wireless communication device comprising at least one transceiver and processing circuitry coupled with the transceiver is provided. The at least one transceiver can be configured to transmit data to and receive data from a cellular network. The processing circuitry can be configured to control the wireless communication device of the second example embodiment to determine that the wireless communication device is experiencing an uplink power limited condition; derive a modified downlink channel quality measurement by adjusting a measured downlink channel quality to indicate a lower downlink channel quality than the measured downlink channel quality; generate a measurement report including the modified downlink channel quality measurement; and send the measurement report to the serving cell to trigger transition of the wireless communication device from the serving cell to a second cell.

In a third example embodiment, a computer program product for triggering cell transition in an UL power limited condition is provided. The computer program product can include at least one non-transitory computer readable storage medium having computer program code stored thereon. The computer program code can include program code, which, when executed by one or more processors implemented on a wireless communication device, can be configured to cause the wireless communication device to perform a method comprising determining that the wireless communication device is experiencing an uplink power limited condition; deriving a modified downlink channel quality measurement by adjusting a measured downlink channel quality to indicate a lower downlink channel quality than the measured downlink channel quality; generating a measurement report including the modified downlink channel quality measurement; and sending the measurement report to the serving cell to trigger transition of the wireless communication device from the serving cell to a second cell.

In a fourth example embodiment, an apparatus for triggering cell transition in an UL power limited condition is provided. The apparatus of the fourth example embodiment can include means for determining that the wireless communication device is experiencing an uplink power limited condition; means for deriving a modified downlink channel quality measurement by adjusting a measured downlink channel quality to indicate a lower downlink channel quality than the measured downlink channel quality; means for generating a measurement report including the modified downlink channel quality measurement; and means for sending the measurement report to the serving cell to trigger transition of the wireless communication device from the serving cell to a second cell.

This Summary is provided merely for purposes of summarizing some example embodiments so as to provide a basic understanding of some aspects of the disclosure. Accordingly, it will be appreciated that the above described example embodiments are merely examples and should not be construed to narrow the scope or spirit of the disclosure in any way. Other embodiments, aspects, and advantages will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION OF SELECTED EMBODIMENTS

Some example embodiments provide for triggering cell transition in an uplink power limited condition such that data stalls, call drops, and/or the like can be prevented in scenarios in which a wireless communication device is limited in accessibility resources due to an uplink power limited condition. In this regard, a wireless communication device in accordance with some example embodiments can be configured to detect a situation in which it has limited UL resources, but has sufficient DL resources. Situations in which the wireless communication device may have limited UL resources can, for example, include situations in which available power headroom (PHR) is approaching 0, a modulation and coding scheme (MCS) used by the device is relatively small, and/or the like. The wireless communication device of such example embodiments can be configured to send a measurement report to a serving cell that includes a modified DL channel quality measurement that has been adjusted to reflect a lower DL channel quality than a DL channel quality actually measured by the device so as to trigger transition of the wireless communication device from the serving cell to a second cell in situations in which it has limited UL resources. Accordingly, transition to a cell that may provide increased UL resources to the wireless communication device can be triggered preemptively before an UL radio link failure resulting from the UL power limited condition causes a data stall, call drop, and/or the like.

Figure 1:
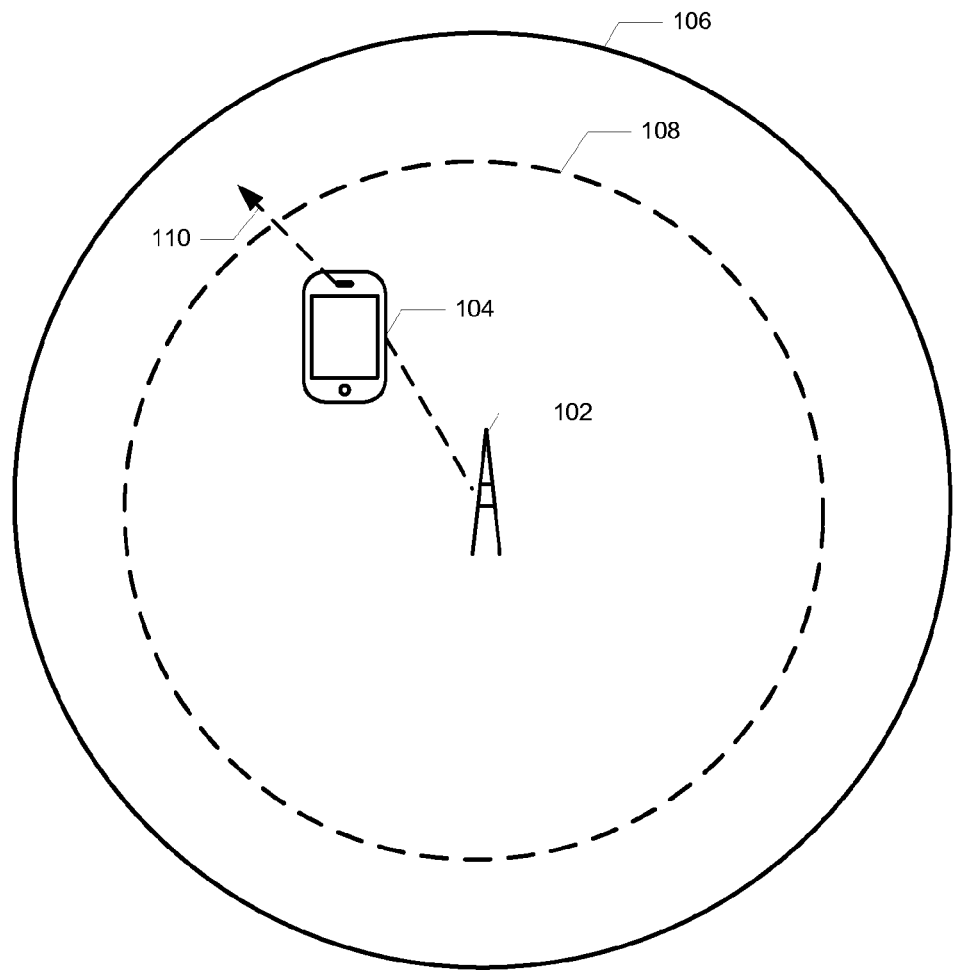
FIG. 1 illustrates limitation of an effective serving cell coverage area in an uplink power limited condition.

FIG. 1 illustrates an example uplink power limited condition that can be addressed by some example embodiments. In FIG. 1, a serving base station 102 can provide access to a cellular network to a wireless communication device 104. The base station 102 can, for example, be embodied as a base transceiver station (BTS), node B, evolved node B (eNB), femtocell, and/or other cellular base station in accordance with various embodiments. In this regard, the type of base station implemented by base station 102 can vary depending on a radio access technology (RAT) used by the base station 102. For example, in embodiments in which the base station 102 implements a Long Term Evolution (LTE) RAT, such as LTE, LTE-Advanced (LTE-A), or the like, the base station 102 can be an eNB. Wireless communication device 104 can, for example, be a smart phone device, tablet computing device, laptop computer, or other computing device that can be configured to operate on a cellular network.

The serving base station 102 can serve a cell having a coverage area 106. The coverage area 106 can, for example, correlate to a power class of the wireless communication device 104. In this regard, the coverage area 106 can define an area in which wireless communication device 104 can both successfully receive and decode DL messages that can be sent by the serving base station 102 and can successfully transmit UL messages to the serving base station 102 when using its maximum transmission power in accordance with its power class. Thus, for example, if the wireless communication device 104 is an LTE power class 3 user equipment (UE) having a 23 dBm transmission power, coverage area 106 can define an area in which UL transmissions sent by the wireless communication device 104 can successfully reach the serving base station 102. In some example embodiments, the coverage area 106 can be defined as an area in which at least a threshold block error rate (BLER) can be satisfied for a given device power class, assuming UL transmissions can occur at up to a transmission power associated with the device power class.

Due to various conditions, the wireless communication device 104 can be power limited to a transmission power less than its power class. For example, the wireless communication device 104 can be power limited to a transmission power of 15 dBm. In this regard, FCC SAR regulations can limit the transmission power that can be used by a wireless communication device in certain operating conditions, such as when the device is proximate to a human body. Such transmission power limitations of the wireless communication device 104 can limit the effective range of the serving cell to an area 108, which can be smaller than the area 106. In this regard, while the wireless communication device 104 may be able to successfully receive and decode DL messages throughout the area 106 in a power limited scenario, UL messages sent by the wireless communication device 104 may not successfully reach the serving base station 102 if the wireless communication device 104 moves outside of the area 108. Thus, if the wireless communication device 104 is traveling in a direction noted by reference 110, an imbalanced link condition can result. In this regard, the wireless communication device 104 can remain on the serving cell due to traditional handover measurements not being triggered as DL power measurements can be satisfactory. However, the wireless communication device 104 can be unable to successfully send UL messages to the serving base station 102 due to its UL power limited condition, which can result in UL radio link failure, which can cause data stalls, dropped calls, and/or other communication interruptions. Some example embodiments disclosed herein trigger cell transition of a wireless communication device to another cell in such scenarios, thereby reducing the incidence of UL radio failure.

Figure 2:
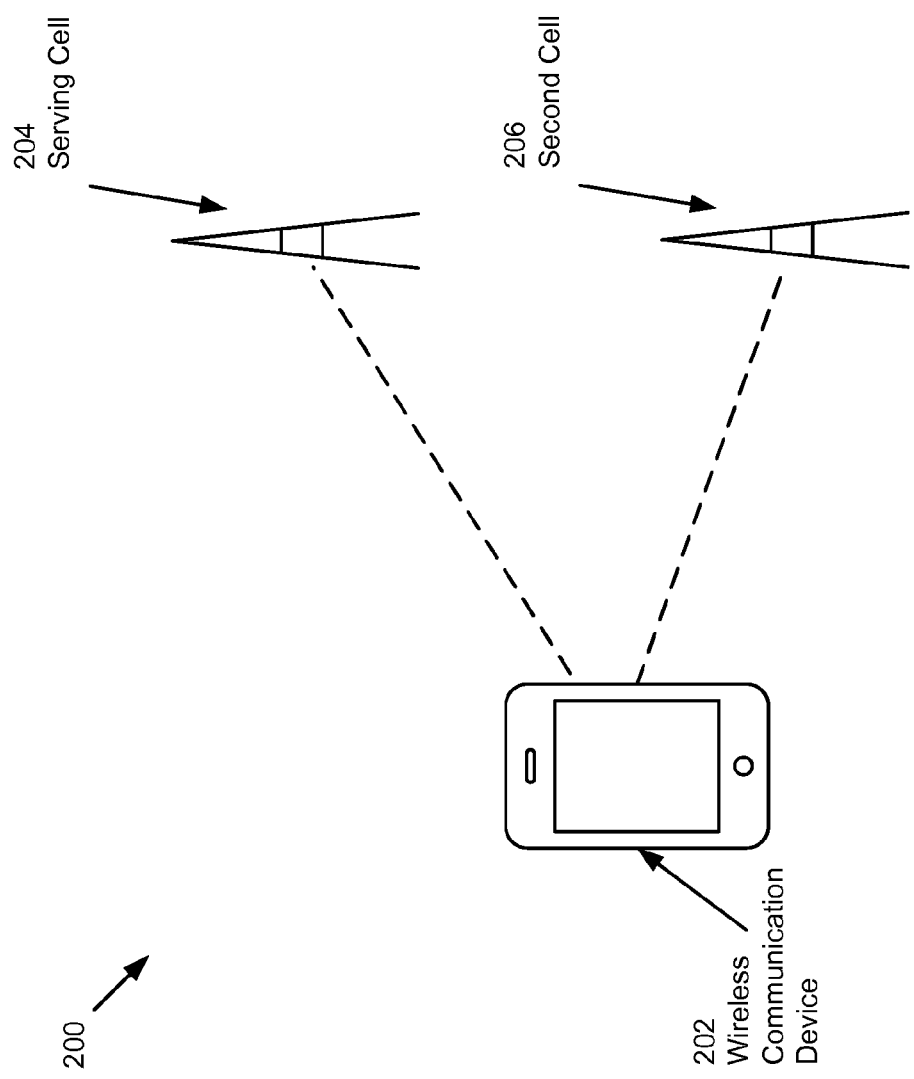
FIG. 2 illustrates a wireless communication system in accordance with some example embodiments.

FIG. 2 illustrates a wireless communication system 200 in accordance with some example embodiments. The wireless communication system 200 can include a wireless communication device 202. By way of non-limiting example, the wireless communication device 202 can comprise a cellular phone, such as a smart phone device, a tablet computing device, and/or the like.

The wireless communication device 202 can be camped on a serving cell 204 of a serving cellular network. The wireless communication device 202 of some example embodiments can be camped on the serving cell 204 in radio resource control (RRC) connected mode, or can be camped on the serving cell 204 in RRC idle mode.

The serving cell 204 can have an associated serving base station, which can be embodied as any cellular base station, including, by way of non-limiting example, a base station, BTS, node B, eNB, femtocell, and/or other cellular base station. They type of base station associated with the serving cell 204 can vary depending on a type of RAT used by the serving cell. In this regard, the serving cell 204 can implement any of a variety of cellular RATs, such as, by way of non-limiting example, an LTE RAT (e.g., LTE, LTE-A, and/or other LTE RAT), Universal Mobile Telecommunications System (UMTS) RAT, code division multiple access (CDMA) RAT, CDMA2000 RAT, Time Division Synchronous Code Division Multiple Access (TD-SCDMA) RAT, global system for mobile communications (GSM) RAT, high rate packet data (HRPD) RAT, 1x/EV-DO, or other existing or future developed cellular RAT.

The wireless communication device 202 can also be within coverage range and/or can enter coverage range during operation of a second cell 206. In this regard, the wireless communication device 202 can be, or come within sufficient proximity of the second cell 206 to transition from the serving cell 204 to the second cell 206, such as through handover, redirection, reselection, selection, and/or other procedure that can be used by a network and/or wireless communication device to transition a wireless communication device between cells. In accordance with some example embodiments, the wireless communication device 202 can be configured to trigger a cell transition from the serving cell 204 to the second cell 206 in response to experiencing an UL power limited condition.

The second cell 206 can have an associated serving base station, which can be embodied as any cellular base station, including, by way of non-limiting example, a base station, BTS, node B, eNB, femtocell, and/or other cellular base station. They type of base station associated with the second cell 206 can vary depending on a type of RAT used by the serving cell. In this regard, the second cell 206 can implement any of a variety of cellular RATs, such as, by way of non-limiting example, an LTE RAT (e.g., LTE, LTE-A, and/or other LTE RAT), UMTS RAT, CDMA RAT, CDMA2000 RAT, TD-SCDMA RAT, GSM RAT, HRPD RAT, 1x/EV-DO, or other existing or future developed cellular RAT. In various embodiments, the second cell 206 can use the same RAT as the serving cell 204, or can use a different RAT than the serving cell 204. As such, it will be appreciated that both transition between cells using the same RAT and inter-RAT (IRAT) transitions in UL power limited conditions are contemplated within the scope of the disclosure.

Figure 3:
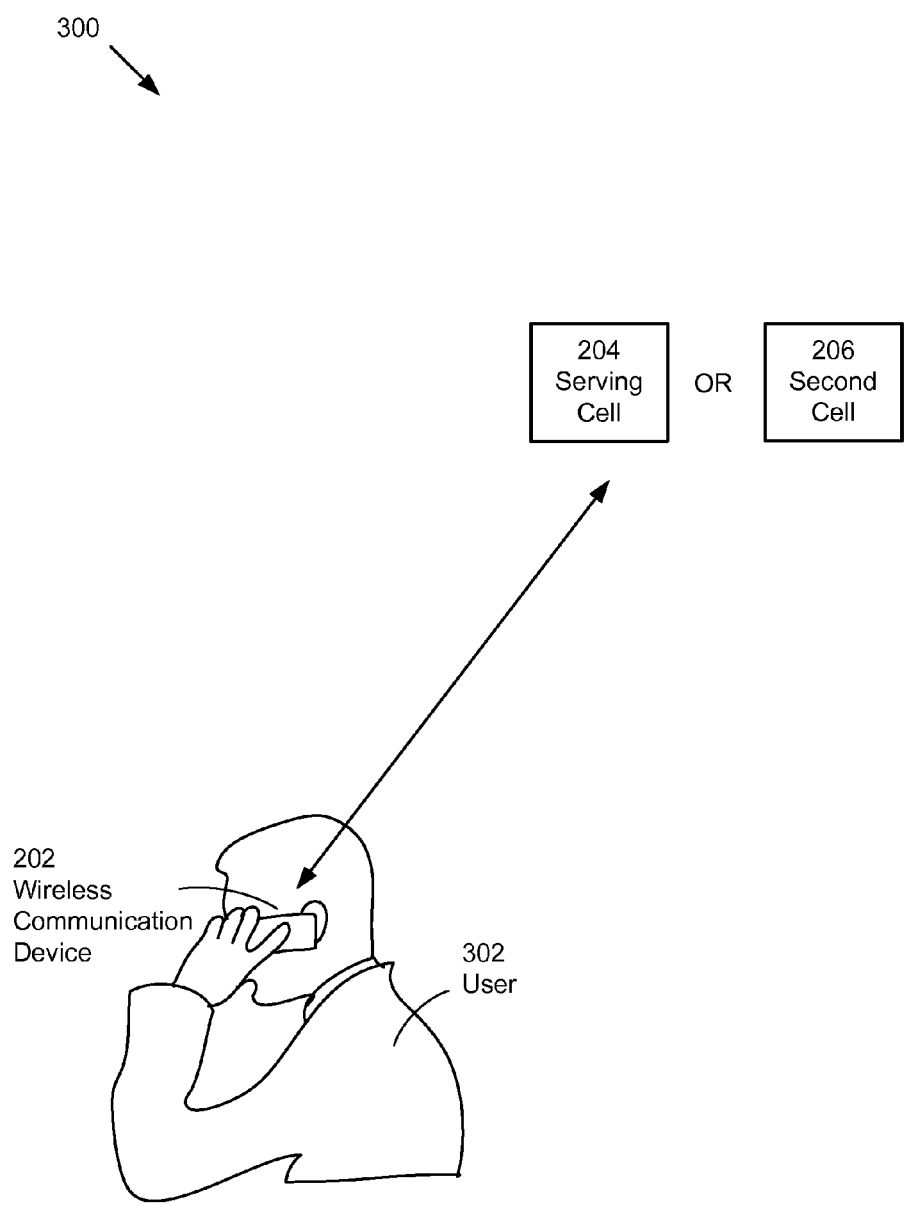
FIG. 3 illustrates an example device usage scenario that can result in an uplink power limited condition in accordance with some example embodiments.

FIG. 3 illustrates an example device usage scenario 300 of the wireless communication device 202 within the system 200 that can result in an UL power limited condition in accordance with some example embodiments. As illustrated, a user 302 can operate a wireless communication device 202 in communication with the serving cell 204. The wireless communication device 202 can include a proximity sensor, such as, proximity sensor 520 illustrated in and described below with respect to FIG. 5, which can be configured to detect objects in close proximity to a transmit antenna of the wireless communication device 202. If the proximity sensor detects a nearby object (which can be conservatively assumed to be a human, such as user 302), the proximity sensor can be configured to responsively trigger a transmission power limitation, such as by adjusting an amount of transmitted radio frequency (RF) energy or by setting a maximum permitted transmission power level to moderate the amount of transmitted RF energy. As a particular contextual example, a wireless communication device in accordance with some example embodiments may be capable of using up to an actual maximum transmission power of 23 dBm. However, when a proximity sensor detects a nearby object, the wireless communication device can limit its transmission power to a lower level, such as 18 dBm.

The transmission power used by a wireless communication device operated in close proximity to a human body can be reduced in accordance with regulations set forth by a regulatory body, such as FCC SAR regulations in the US. It will be appreciated that the applicable regulations and, thus a maximum allowable transmission power when a wireless communication device, such as wireless communication device 202, is operated in close proximity to a human body can vary across geographic regions having different regulatory bodies, when using different RF bands, and/or based on other criteria.

By limiting the transmission power when in proximity of the user 302, the wireless communication device 202 necessarily introduces an UL power limited condition resulting in a link imbalance. To illustrate this link imbalance, consider the scenario where the serving cell 204 (e.g., the base station associated with the serving cell 204) transmits a first RF signal in a DL direction to the wireless communication device 202 at 23 dBm and the first signal is attenuated by the RF channel linking the wireless communication device 202 to the serving cell 204, resulting in the first signal being received at the wireless communication device 202 with an RF signal power level of approximately −115 dBm. If the wireless communication device 202 transmits a second RF signal at 23 dBm in an UL direction from the wireless communication device 202 to the serving cell 204, then a symmetric RF channel can attenuate the second RF signal by an equal amount, such that the serving cell 204 can receive the second RF signal at a signal power level of approximately −115 dBm as well. However, in the scenario illustrated in FIG. 3, if the wireless communication device 202 is limited to transmit in the UL direction at a maximum transmission power level of 18 dBm (instead of a maximum of 23 dBm) then the serving cell 204 can receive the second RF signal at a signal power level of only −120 dBm, even though the receive RF link, or DL, of the wireless communication device 202 can be unaffected such that the wireless communication device 202 can still receive the first RF signal at a signal power level of −115 dBm. This corresponding drop in performance for UL signals in an UL power limited condition can greatly affect the wireless communication device 202 operation, and in some cases can result in excessive radio link failures, undesirable re-transmission burdens, and/or added coding complexity.

It will be appreciated, however, that the illustration of FIG. 3 is provided by way of example, and not by way of limitation. In this regard, embodiments disclosed herein are not limited to application in UL power limited conditions resulting from a reduction in transmission power in response to the wireless communication device 202 being positioned in close proximity to a human body. A person having ordinary skill in the art will realize that transmission power can be reduced by the wireless communication device 202 for a variety of reasons in various example embodiments. For example, in some embodiments, the wireless communication device 202 can limit the device's transmission power in certain scenarios so as to reduce power consumption and/or to satisfy a set of thermal constraints. As a further example, the wireless communication device 202 of some example embodiments can be configured to limit its transmit radio frequency power so as to reduce interference with another higher priority coexisting wireless radio frequency technology resident in the wireless communication device 202. As still a further example, the wireless communication device 202 of some example embodiments may reduce transmission power to limit a probability of intercept (LPI) or to reduce detection, such as in military or Homeland Defense applications. It will be appreciated that any such reduction in transmission power can result in the wireless communication deceive 202 experiencing an UL power limited condition in which there can be a link imbalance between UL channel quality and DL channel quality. As such, it will be appreciated that embodiments disclosed herein can be applied in any UL power limited condition that can result from a reduction in transmission power by the wireless communication device 202.

Moreover, while various embodiments described herein refer to actively generated UL power limited conditions (e.g., UL power limited conditions resulting from intentional reduction in transmission power by the wireless communication device 202), it will be appreciated that UL power limited conditions in which there is a link imbalance between UL channel quality and DL channel quality can also include passively occurring or induced UL power limited conditions. For example, wireless communication device 202 can experience an UL power limited condition in a use scenario in which transmit and receive signal paths and/or wireless signal processing functions are distinct (e.g., spatially, temporally, spectrally, algorithmically, etc.) in the wireless communication device 202 and have unrelated (or loosely related) degrees of performance. As still a further example, the wireless communication device 202 of some example embodiments can include a transmitter and receiver having different radio frequency power capabilities, which can, in some operating conditions, result in the wireless communication device 202 experiencing an UL power limited condition in which there is a link imbalance between UL channel quality and DL channel quality. For example, many near-field technologies are designed for asymmetric operation (e.g., one radio frequency device can have significantly more transmission power than the other radio frequency device). Accordingly, it will be appreciated that embodiments disclosed herein can also be applied to passively occurring UL power limited conditions, including link imbalances that can result from the radio frequency transmission or reception environment, design asymmetries, different transmit/receive processing chains, and/or other factors.

Figure 4:
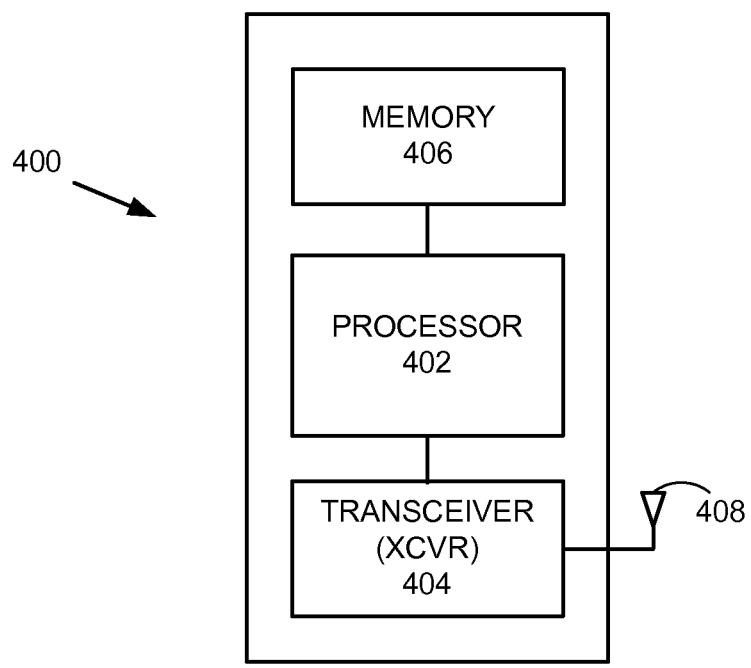
FIG. 4 illustrates a block diagram of an apparatus that can be implemented on a wireless communication device in accordance with some example embodiments.

FIG. 4 illustrates a block diagram of an apparatus 400 that can be implemented on a wireless communication device, such as wireless communication device 202, in accordance with some example embodiments. The apparatus 400 can include a processor 402 coupled with memory 406 and also coupled with a wireless transceiver 404. Processor 402 can be configured to read, write and execute processor instructions stored in memory 406. Processor 402 can also be configured to control wireless transceiver 404. Wireless transceiver 404 can be coupled with an antenna 408. In some embodiments, wireless transceiver 404, in combination with antenna 408 can enable the wireless communication device 202 to connect to a wireless network, such as via serving cell 204 and second cell 206. It will be appreciated that the processor 402 can be configured through hardware, software (e.g., software that can be stored in memory 406), firmware (e.g., firmware that can be stored in memory 406), and/or some combination thereof to control one or more operations that can be performed by a wireless communication device 202 in accordance with various example embodiments.

Figure 5:
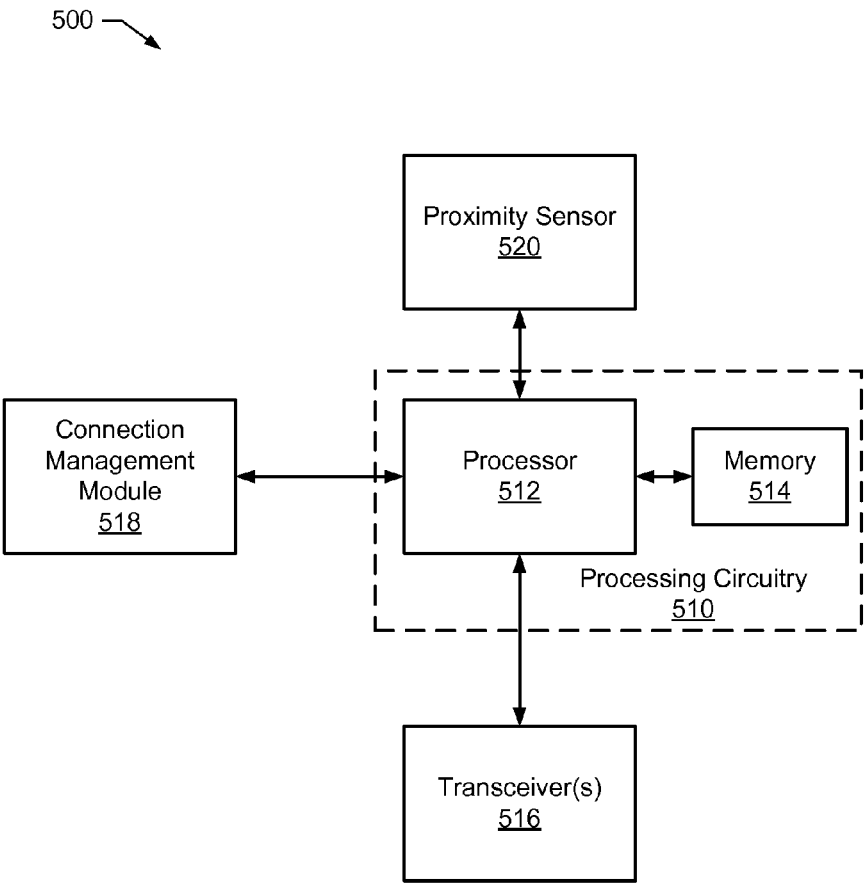
FIG. 5 illustrates another block diagram of an apparatus that can be implemented on a wireless communication device in accordance with some example embodiments.

FIG. 5 illustrates a block diagram of an apparatus 500, which is another example apparatus that can be implemented on a wireless communication device, such as wireless communication device 202, in accordance with some example embodiments. When implemented on a computing device, such as wireless communication device 202, apparatus 500 can provide an apparatus configured to enable the computing device to operate within the system 200 in accordance with one or more example embodiments. It will be appreciated that the components, devices or elements illustrated in and described with respect to FIG. 5 below may not be mandatory and thus some may be omitted in certain embodiments.

Additionally, some embodiments can include further or different components, devices or elements beyond those illustrated in and described with respect to FIG. 5.

In some example embodiments, the apparatus 500 can include processing circuitry 510 that is configurable to perform actions in accordance with one or more example embodiments disclosed herein. In this regard, the processing circuitry 510 can be configured to perform and/or control performance of one or more functionalities of the apparatus 500 in accordance with various example embodiments, and thus can provide means for performing functionalities of the wireless communication device 202 in accordance with various example embodiments. The processing circuitry 510 can be configured to perform data processing, application execution and/or other processing and management services according to one or more example embodiments.

In some embodiments, the apparatus 500 or a portion(s) or component(s) thereof, such as the processing circuitry 510, can include one or more chipsets, which can each include one or more chips. The processing circuitry 510 and/or one or more further components of the apparatus 500 can therefore, in some instances, be configured to implement an embodiment on a chipset(s), such as a system on a chip. In some example embodiments in which one or more components of the apparatus 500 are embodied as a chipset, the chipset can be capable of enabling a computing device to operate in the system 200 when implemented on or otherwise operably coupled to the computing device. Thus, for example, one or more components of the apparatus 500 can provide a cellular baseband chipset, which can enable a computing device to operate within a cellular network.

In some example embodiments, the processing circuitry 510 can include a processor 512 and, in some embodiments, such as that illustrated in FIG. 5, can further include memory 514. The processing circuitry 510 can be in communication with or otherwise control transceiver(s) 516, connection management module 518, and/or proximity sensor 520.

The processor 512 can be embodied in a variety of forms. For example, the processor 512 can be embodied as various hardware-based processing means such as a microprocessor, a coprocessor, a controller or various other computing or processing devices including integrated circuits such as, for example, an ASIC (application specific integrated circuit), an FPGA (field programmable gate array), some combination thereof, or the like. Although illustrated as a single processor, it will be appreciated that the processor 512 can comprise a plurality of processors. The plurality of processors can be in operative communication with each other and can be collectively configured to perform one or more functionalities of the apparatus 500 as described herein. The processor 512 of some example embodiments can be an embodiment of the processor 402. In some example embodiments, the processor 512 can be configured to execute instructions that can be stored in the memory 514 or that can be otherwise accessible to the processor 512. As such, whether configured by hardware or by a combination of hardware and software, the processor 512 can be capable of performing operations according to various embodiments while configured accordingly.

In some example embodiments, the memory 514 can include one or more memory devices. Memory 514 can include fixed and/or removable memory devices. In some embodiments, the memory 514 can provide a non-transitory computer-readable storage medium that can store computer program instructions that can be executed by the processor 512. In this regard, the memory 514 can be configured to store information, data, applications, instructions and/or the like for enabling the apparatus 500 to carry out various functions in accordance with one or more example embodiments. The memory 514 of some example embodiments can be an embodiment of the memory 406. In some embodiments, the memory 514 can be in communication with one or more of the processor 512, transceiver(s) 516, connection management module 518, or proximity sensor 520 via a bus (or buses) for passing information among components of the apparatus 500.

The apparatus 500 can further include one or more transceivers 516. The transceiver(s) 516 can enable the apparatus 500 to send wireless signals to and receive signals from one or more cellular networks. As such, the transceiver(s) 516 can be configured to support any type of cellular RAT that can be implemented by the serving cell 204 and/or second cell 206. In some example embodiments, the transceiver(s) 516 can be an embodiment of the transceiver 404.

The apparatus 500 can further include connection management module 518. The connection management module 518 can be embodied as various means, such as circuitry, hardware, a computer program product comprising a computer readable medium (for example, the memory 514) storing computer readable program instructions executable by a processing device (for example, the processor 512), or some combination thereof. In some embodiments, the processor 512 (or the processing circuitry 510) can include, or otherwise control the connection management module 518. The connection management module 518 can be configured in some example embodiments to determine when the wireless communication device 202 is experiencing an UL power limited condition and to trigger a transition of the wireless communication device 202 from the serving cell 204 to the second cell 206 in response to the UL power limited condition.

In some example embodiments, the apparatus 500 can additionally include proximity sensor 520. The proximity sensor 520 can be configured to detect objects in close proximity (e.g., within a defined threshold proximity) of the wireless communication device 202. For example, in some embodiments, the proximity sensor 520 can be configured to detect an object in close proximity to transceiver(s) 516, a transmit antenna, and/or other structure via which a radio frequency signal can be emitted by wireless communication device 202. In some example embodiments, the proximity sensor 520 can be configured to distinguish between human and non-human objects, such as based on a thermal profile of the detected object. However, in some example embodiments, the proximity sensor 520 can be configured to conservatively assume any detected object is a human, such as the user 302. In accordance with some example embodiments, the proximity sensor 520 can be configured to trigger a transmission power limitation, such as by adjusting an amount of transmitted radio frequency energy or by setting a maximum permitted transmission power level to moderate the amount of transmitted radio frequency energy, in response to detecting an object in close proximity.

The connection management module 518 can be configured to determine that the wireless communication device 202 is experiencing an UL power limited condition based on any of a variety of indications. For example, in some embodiments, the connection management module 518 can be configured to determine that the wireless communication device 202 is experiencing an UL power limited condition based at least in part on a internal indication of an operating condition, such as an indication from proximity sensor 520 and/or transceiver(s) 516 of that a maximum transmission power of the wireless communication device 202 has been reduced from a previous transmission power level, such as in response to the proximity sensor 520 detecting an object in close proximity to the wireless communication device 202.

Additionally or alternatively, the connection management module 518 of some example embodiments can be configured to determine that the wireless communication device 202 is experiencing an UL power limited condition based at least in part on observed UL channel quality conditions. For example, in some example embodiments, one or more UL channel quality thresholds can be defined and the connection management module 518 can be configured to compare one or more observed UL channel quality metrics to the UL channel quality threshold(s). If an observed UL channel quality metric indicates that UL channel quality is less than a threshold UL channel quality given observed DL channel quality, the connection management module 518 of some example embodiments can be configured to determine that the wireless communication device 202 is experiencing an UL power limited condition. In some example embodiments, the UL channel quality threshold(s) can be defined to enable the wireless communication device 202 to determine existence of the UL power limited condition while UL channel quality is still good enough to enable the wireless communication device 202 to successfully send a modified measurement report to the serving cell 204, as described further below, prior to any UL radio link failure.

In some such example embodiments, the connection management module 518 can be configured to detect existence of an UL power limited condition based at least in part on an observed UL error rate, such as a block error rate (BLER) experienced on the UL. For example, if the BLER exceeds a threshold BLER, such as, by way of non-limiting example, 15% BLER, the wireless communication device 202 can be configured to determine that an UL power limited condition exists. In some such embodiments, an UL power limited condition can be detected for an UL BLER exceeding a threshold BLER in an instance in which a DL channel quality, such as a measured reference signal received power (RSRP) on the DL satisfies a threshold quality and/or in an instance in which there have not been any Radio Link Control (RLC) or random access channel (RACH) failures on the DL. In this regard, a threshold BLER and/or other UL error rate can be defined based on an expected maximum error rate that would be observed given the observed DL conditions (e.g., RSRP observed on the DL, number of RLC failures observed on the DL, number of RACH failures observed on the DL, and/or other indication of DL conditions). The wireless communication device 202 can, for example, be configured to calculate the BLER and/or other error rate experienced on the UL based at least in part on acknowledgements (ACKs) and non-acknowledgements (NACKs) received from the serving cell 204 for data sent on the UL by the wireless communication device 202.

Additionally or alternatively, in some example embodiments, the connection management module 518 can be configured to determine existence of an UL power limited condition based at least in part on available power headroom (PHR). For example, if the PHR available to the wireless communication device 202 falls below a threshold, the connection management module 518 of some example embodiments can be configured to determine that it the wireless communication device 202 is experiencing an UL power limited condition. For example, if the available PHR approaches or reaches 0, in some example embodiments, the connection management module 518 can be configured to determine that it the wireless communication device 202 is experiencing an UL power limited condition.

In some example embodiments, the connection management module 518 can additionally or alternatively be configured to determine existence of an UL power limited condition based at least in part on UL RLC retransmission (ReTX) failures experienced by the wireless communication device 202. For example, in some embodiments, if the wireless communication device 202 has experienced a threshold number of UL RLC ReTX failures, the connection management module 518 can be configured to determine that the wireless communication device 202 is experiencing an UL power limited condition. The threshold number can, for example, be a threshold number of consecutive UL RLC ReTX failures, a threshold number of UL RLC ReTX failures experienced on the serving cell 204, a threshold number of UL RLC ReTX failures experienced within a certain period of time, and/or the like.

Additionally or alternatively, in some example embodiments, the connection management module 518 can be configured to determine existence of an UL power limited condition based at least in part on failed RACH attempts that can be experienced by the wireless communication device 202. In this regard, in some example embodiments, if the wireless communication device 202 has performed a threshold number of failed RACH attempts (e.g., a threshold total number of failed RACH attempts, a threshold number of consecutive failed RACH attempts, a threshold number of failed RACH attempts on the serving cell 204, a threshold number of failed RACH attempts within a certain period of time, and/or the like), the connection management module 518 of some example embodiments can be configured to determine that the wireless communication device 202 is experiencing an UL power limited condition.

For example, in some example embodiments, if the wireless communication device 202 is operating in connected mode, the connection management module 518 can be configured to determine existence of an UL power limited condition in an instance in which a threshold number of failed RACH attempts are experienced on the UL when the wireless communication device 202 is using a maximum available transmission power. In some such example embodiments, the threshold number of failed RACH attempts may be a threshold number of consecutive failed RACH attempts.

As another example, in some example embodiments, if the wireless communication device 202 is operating in idle mode, the connection management module 518 can be configured to determine existence of an UL power limited condition in an instance in which a threshold number of failed RACH attempts are experienced on the UL. In some such example embodiments, transmission power can be increased for each successive RACH attempt until the UL power limited condition is detected, or until a maximum available transmission power is reached.

The wireless communication device 202 in accordance with some example embodiments can be configured to send a measurement report to the serving cell 204 that includes a modified DL channel quality measurement in response to detecting an UL power limited condition so as to trigger transition of the wireless communication device 202 from the serving cell 204 to the second cell 206. In this regard, the wireless communication device 202 can be configured to measure a DL channel quality. By way of non-limiting example, the measured DL channel quality can be an RSRP measurement, reference signal received quality (RSRQ) measurement, received signal strength indicator (RSSI)

measurement, received signal code power (RSCP), signal to noise ratio (SNR), Signal to noise plus interference ratio (SINR), and/or the like. However, it will be appreciated that other channel quality measurements are contemplated within the scope of the disclosure. The connection management module 518 can be configured to derive a modified DL channel quality measurement by adjusting the measured DL channel quality to indicate a lower DL channel quality than the measured DL channel quality. For example, the wireless communication device 202 can apply a variable offset based on an extent of the UL power limited condition. The offset can, for example be applied based on filtered history of current measurements of DL resources (e.g., a filtered DL channel quality measurement derived from filtering a plurality of instantaneous DL channel quality measurements). In some example embodiments, the value of the applied offset can be based on network set criteria, a policy implemented on the wireless communication device 202, based on event reporting thresholds that can be set by the network, and/or the like. As a further example, in some embodiments, the offset can be equal to an extent of the imbalance between the UL channel quality and the DL channel quality (e.g., the difference between the UL signal power and the DL signal power). The connection management module 518 can be further configured to generate a measurement report including the modified DL channel quality measurement. The wireless communication device 202 can be configured to send the measurement report to the serving cell 204 to trigger transition of the wireless communication device 202 from the serving cell 204 to the second cell 206.

In some example embodiments, the connection management module 518 can be configured to ensure that a measurement report including a modified DL channel quality measurement is sent before UL resources deteriorate to a point at which the measurement report cannot be successfully sent to the serving cell 204. For example, as discussed above, thresholds for determining an UL power limited condition can be configured to determine existence of an UL power limited condition prior to UL resources deteriorating to point at which the measurement report cannot be successfully sent to the serving cell 204.

Figure 6:
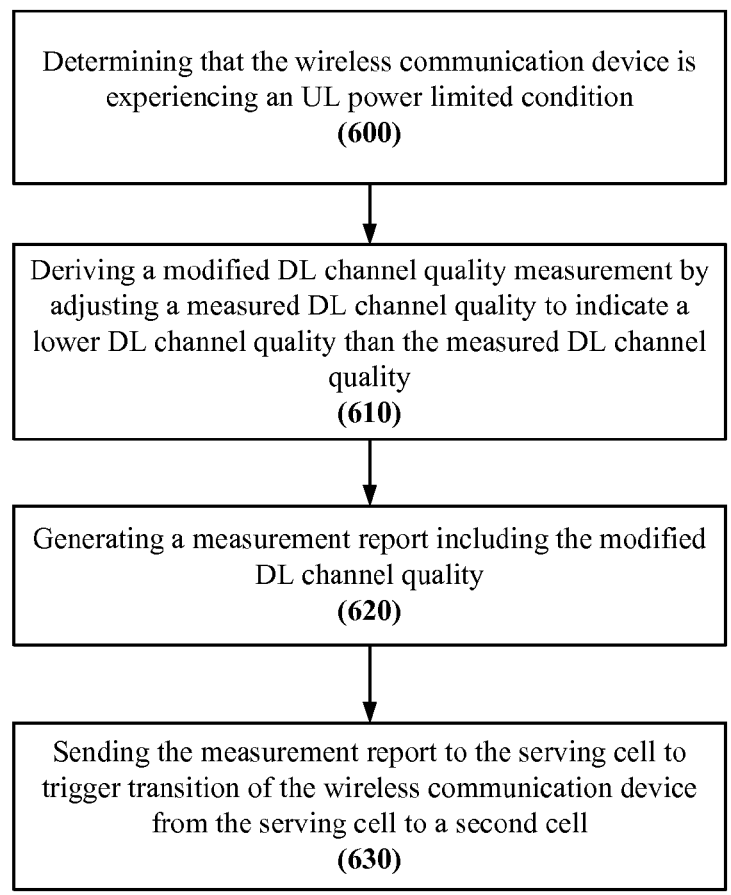
FIG. 6 illustrates a flowchart of an example method for triggering cell transition in an uplink power limited condition in accordance with some example embodiments.

FIG. 6 illustrates a flowchart of an example method for triggering cell transition in an uplink power limited condition in accordance with some example embodiments. In this regard, FIG. 6 illustrates operations that can be performed by wireless communication device 202 in accordance with some example embodiments. One or more of processor 402, transceiver 404, memory 406, processing circuitry 510, processor 512, memory 514, transceiver(s) 516, connection management module 518, or proximity sensor 520 can, for example, provide means for performing one or more of the operations illustrated in and described with respect to FIG. 6.

Operation 600 can include the wireless communication device 202 determining that the wireless communication device 202 is experiencing an UL power limited condition. For example, in some embodiments, operation 600 can include determining that the wireless communication device 202 is experiencing the UL power limited condition based at least in part hardware conditions, such as a transmission power being used by the wireless communication device 202, an output of the proximity sensor 520 (e.g., indicating that the wireless communication device 202 is proximate to a human body, such as user 302), and/or the like. Additionally or alternatively, in some example embodiments, operation 600 can include determining that the wireless communication device 202 is experiencing the UL power limited condition based on observed UL channel quality indicators, such as an observed UL error rate, available PHR, a number of UL RLC ReTX failures experienced by the wireless communication device 202 (e.g., in accordance with the method illustrated in and described below with FIG. 7), a number of failed RACH attempts performed by the wireless communication device 202 (e.g., in accordance with the methods illustrated in and described below with FIGS. 7 and 8), and/or the like.

Operation 610 can include the wireless communication device 202 deriving a modified DL channel quality measurement by adjusting a measured DL channel quality to indicate a lower DL channel quality than the measured DL channel quality. Operation 620 can include the wireless communication device 202 generating a measurement report including the modified DL channel quality. Operation 630 can include the wireless communication device 202 sending the measurement report to the serving cell 204 to trigger transition of the wireless communication device 202 from the serving cell 204 to another cell, such as the second cell 206.

Figure 7:
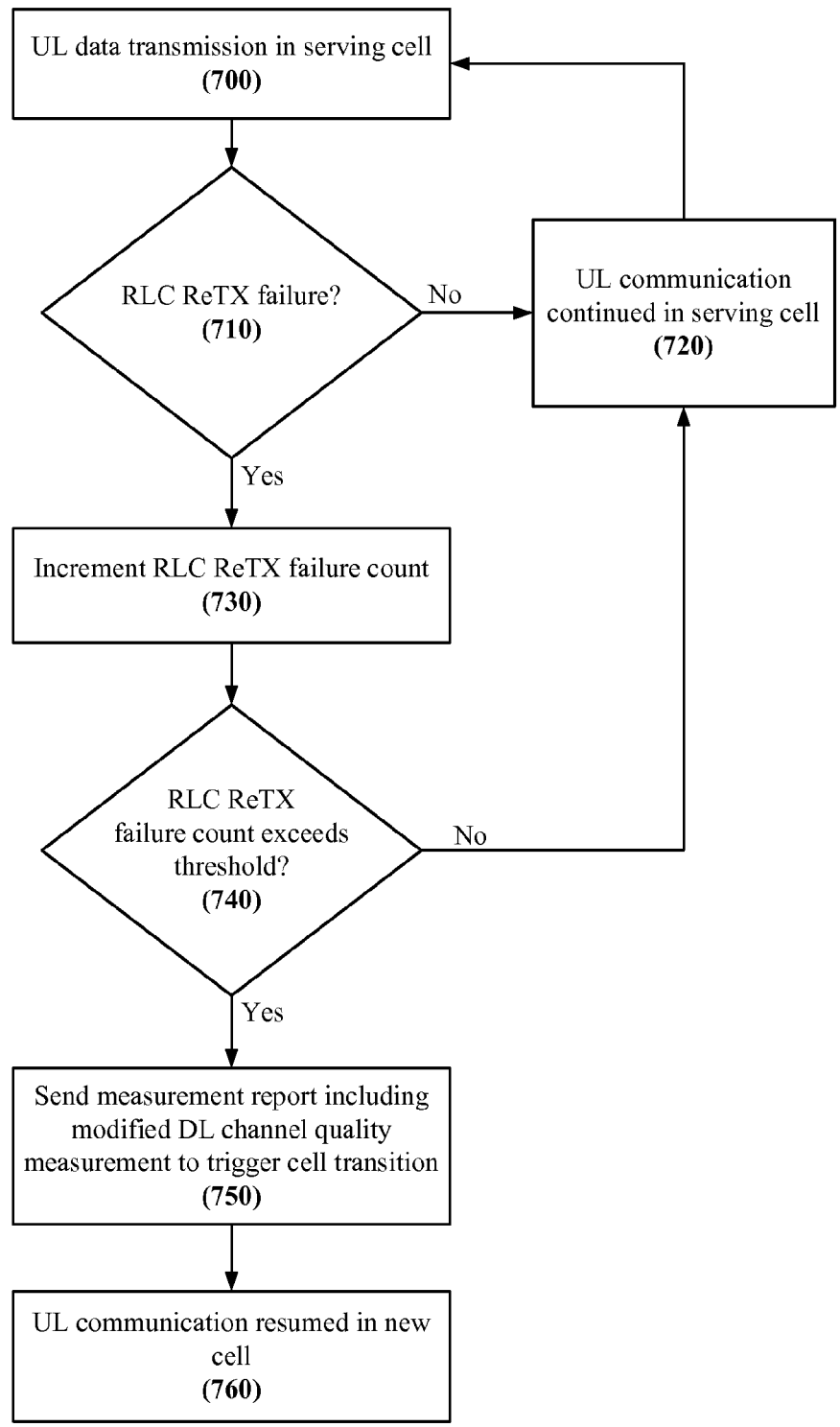
FIG. 7 illustrates a flowchart of an example method for detecting an uplink power limited condition based on radio link control retransmission failures and triggering cell transition in response thereto in accordance with some example embodiments.

FIG. 7 illustrates a flowchart of an example method for detecting an uplink power limited condition based on radio link control retransmission failures and triggering cell transition in response thereto in accordance with some example embodiments. In this regard, FIG. 7 illustrates operations that can be performed by wireless communication device 202 in accordance with some example embodiments. One or more of processor 402, transceiver 404, memory 406, processing circuitry 510, processor 512, memory 514, transceiver(s) 516, connection management module 518, or proximity sensor 520 can, for example, provide means for performing one or more of the operations illustrated in and described with respect to FIG. 7.

Operation 700 can include the wireless communication device 202 transmitting data on the UL in serving cell 204. Operation 710 can include determining whether an RLC ReTX failure has been experienced. If it is determined at operation 710 that no RLC ReTX failure has occurred, then the method can proceed to operation 720, in which UL communication can be continued in the serving cell 204, and the method can return to operation 700 if there is more UL data to transmit.

If, however, it is determined at operation 710 that an RLC ReTX failure has occurred, the method can proceed to operation 720, in which a count of a number of experienced RLC ReTX, at which it can be determined whether the number of RLC ReTX failures experienced by the wireless communication device 202, RLC ReTX failure count, can be incremented. RLC ReTX failure count can, for example, be a count of a number of consecutive RLC ReTX failures, a number of RLC ReTX failures experienced in the serving cell 204, or a number of RLC ReTX failures experienced within a defined period of time. Operation 740 can include the wireless communication device 202 determining whether RLC ReTX failure count exceeds a threshold number of RLC ReTX failures.

If it is determined at operation 740 that the RLC ReTX failure count does not exceed the threshold, the method can proceed to operation 720, and the wireless communication device 202 can continue to engage in UL communication in the serving cell. The method can return to operation 700 if there is more UL data to transmit.

However, if it is determined at operation 740 that the RLC ReTX failure count does exceed the threshold, the method can instead proceed to operation 750, which can include the wireless communication device 202 sending a measurement report including a modified DL channel quality measurement to trigger cell transition. In this regard, if the RLC ReTX failure count exceeds the threshold, the wireless communication device 202 can determine that it is experiencing an UL power limited condition. As such, operation 740 can, for example, correspond to an embodiment of operation 600, and operation 750 can, for example, correspond to an embodiment of operations 610-630. Operation 760 can include the wireless communication device 202 resuming UL communication in a new cell, such as second cell 206, following cell transition from the serving cell 204.

Figure 8:
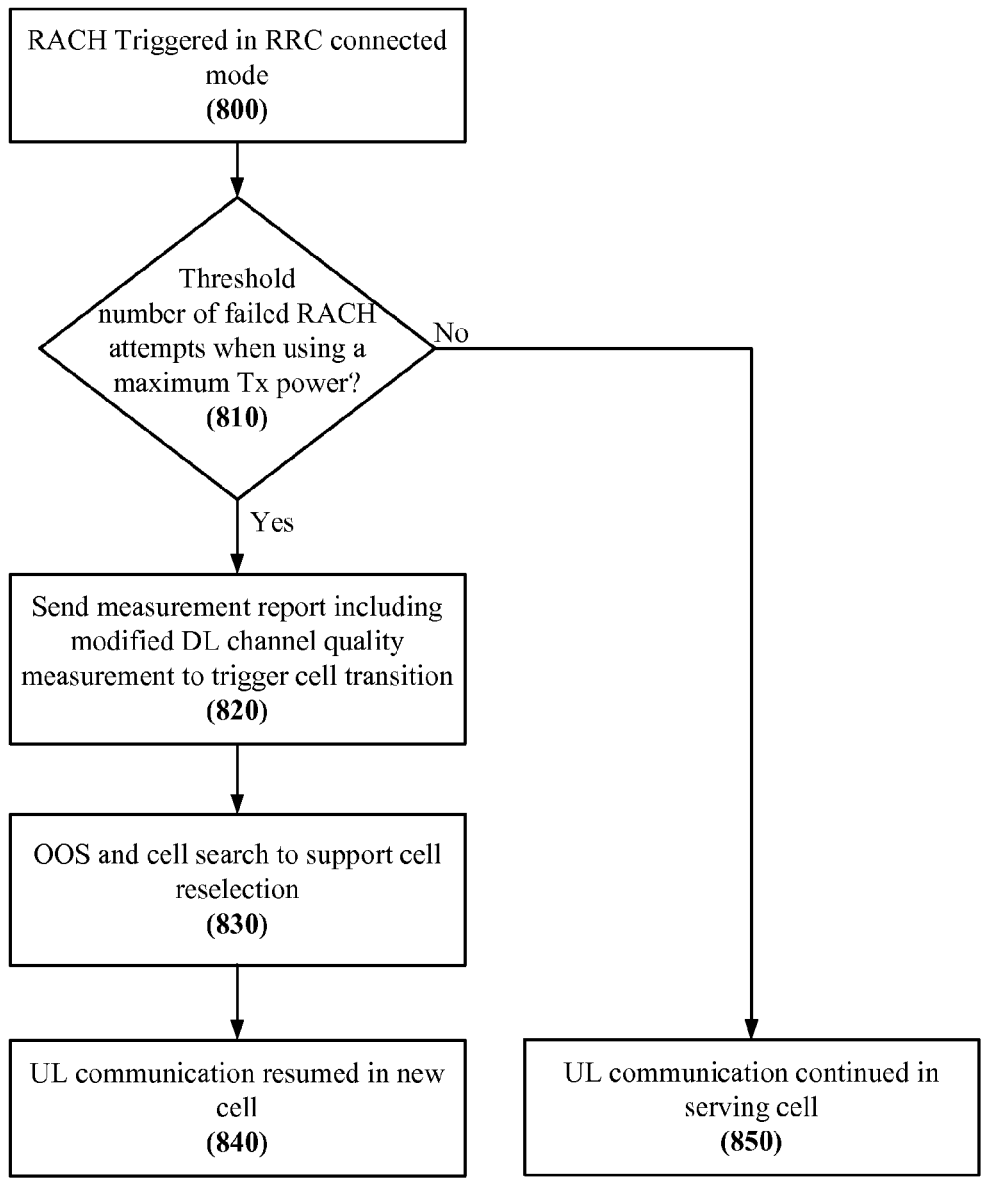
FIG. 8 illustrates a flowchart of an example method for detecting an uplink power limited condition in connected mode and triggering cell reselection in response thereto in accordance with some example embodiments.

FIG. 8 illustrates a flowchart of an example method for detecting an uplink power limited condition in connected mode and triggering cell reselection in response thereto in accordance with some example embodiments. In this regard, FIG. 8 illustrates operations that can be performed by wireless communication device 202 in accordance with some example embodiments. One or more of processor 402, transceiver 404, memory 406, processing circuitry 510, processor 512, memory 514, transceiver(s) 516, connection management module 518, or proximity sensor 520 can, for example, provide means for performing one or more of the operations illustrated in and described with respect to FIG. 8.

In the method of FIG. 8, the wireless communication device 202 can be camped on the serving cell 204 in RRC connected mode. Operation 800 can include the wireless communication device 202 triggering a RACH procedure. The RACH procedure can include continuing to attempt RACH until an attempt is successful, or until the condition of operation 810 is met.

Operation 810 can include the wireless communication device 202 determining whether a threshold number of failed RACH attempts (e.g., a threshold number of consecutive failed RACH attempts) have occurred when using a maximum transmission power (e.g., a maximum allowable and/or available transmission power). Operation 810 can, for example, be performed after each RACH attempt until a RACH attempt is successful or until the threshold number of RACH attempts have been performed using the maximum transmission power.

If it is determined at operation 810 that a threshold number of failed RACH attempts have not been performed, the method can proceed to operation 850, in which UL communication can be continued in the serving cell 204.

If, however, it is determined at operation 810 that the threshold number of failed RACH attempts have been performed, the method can instead proceed to operation 820, which can include the wireless communication device 202 sending a measurement report including a modified DL channel quality measurement to trigger cell transition. In this regard, if the threshold number of RACH attempts has been performed, the wireless communication device 202 can determine that it is experiencing an UL power limited condition. As such, operation 810 can, for example, correspond to an embodiment of operation 600, and operation 820 can, for example, correspond to an embodiment of operations 610-630.

Operation 820 can include the wireless communication device 202 entering an out of service (OOS) state and performing an OOS cell search to support reselection to another cell. The second cell 206 can, fore example, be identified in the cell search, and the wireless communication device 202 can perform reselection to the second cell 206. Operation 840 can then include the wireless communication device 202 resuming UL communication in the new cell (e.g., second cell 206) after reselection.

Figure 9:
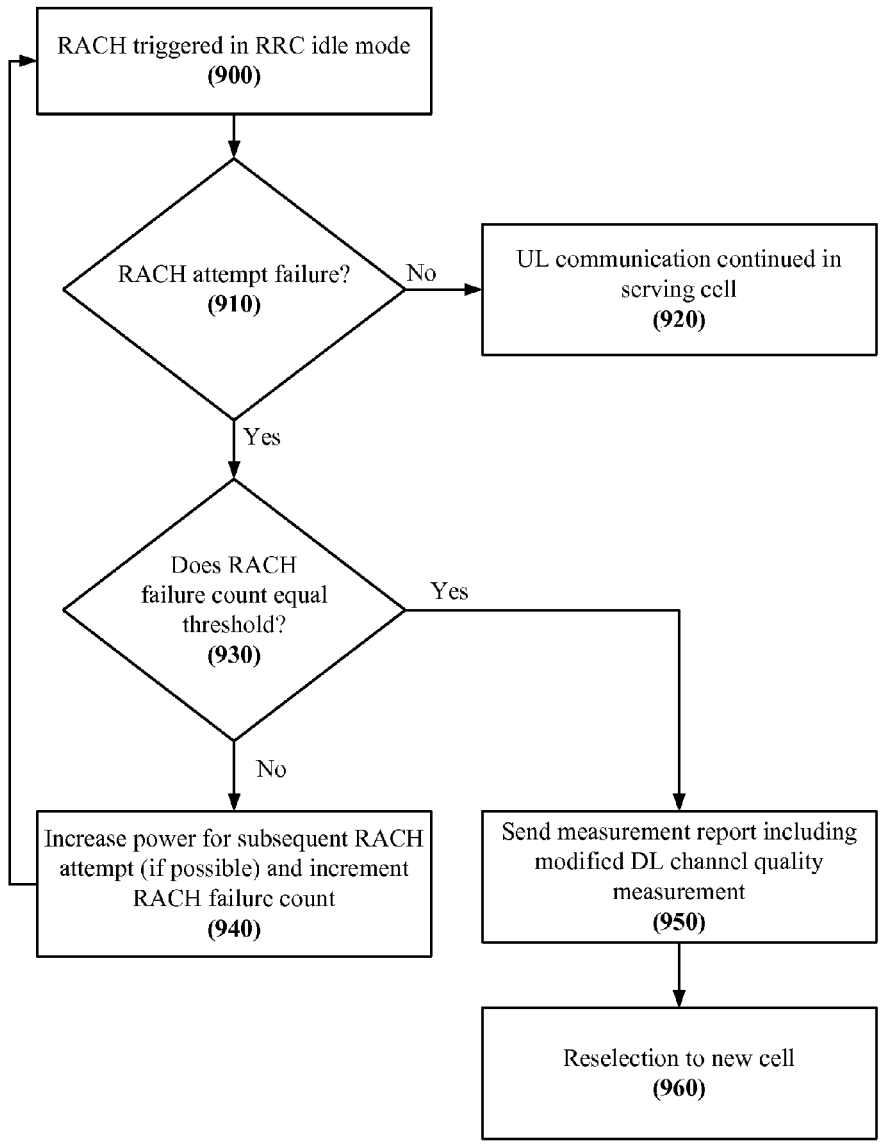
FIG. 9 illustrates a flowchart of an example method for detecting an uplink power limited condition in idle mode and triggering cell reselection in response thereto in accordance with some example embodiments.

FIG. 9 illustrates a flowchart of an example method for detecting an uplink power limited condition in idle mode and triggering cell reselection in response thereto in accordance with some example embodiments. In this regard, FIG. 9 illustrates operations that can be performed by wireless communication device 202 in accordance with some example embodiments. One or more of processor 402, transceiver 404, memory 406, processing circuitry 510, processor 512, memory 514, transceiver(s) 516, connection management module 518, or proximity sensor 520 can, for example, provide means for performing one or more of the operations illustrated in and described with respect to FIG. 9.

In the method of FIG. 9, the wireless communication device 202 can be camped on the serving cell 204 in RRC idle mode. Operation 900 can include the wireless communication device 202 triggering a RACH procedure while the wireless communication device 202 is in RRC idle mode.

Operation 910 can include the wireless communication device 202 determining whether a failed RACH attempt has occurred. If it is determined at operation 910 that a failed RACH attempt has not occurred, the method can proceed to operation 920, in which UL communication can be continued in the serving cell 204.

If, however, it is determined at operation 910 that a failed RACH attempt has occurred, the method can include proceeding to operation 930, which can include the wireless communication device 202 determining whether a RACH failure count equals a threshold. The RACH failure count can, for example, be a count of a number of consecutive failed RACH attempts, a number of failed RACH attempts performed in the serving cell 204, or a number of failed RACH attempts performed within a defined period of time.

If it is determined at operation 930 that the RACH failure count does not equal the threshold, the method can proceed to operation 940, which can include the wireless communication device 202 increasing a transmission power for a subsequent RACH attempt (if there is available PHR to support increasing the transmission power) and incrementing the RACH failure count. The method can then return to operation 900, and another RACH attempt can be performed.

If, however, it is determined at operation 930 that the RACH failure count does equal the threshold, the method can instead proceed to operation 950, which can include the wireless communication device 202 sending a measurement report including a modified DL channel quality measurement to trigger reselection to another cell. In this regard, if the wireless communication device 202 has performed a threshold number of failed RACH attempts, the wireless communication device 202 can determine that it is experiencing an UL power limited condition. As such, operation 930 can, for example, correspond to an embodiment of operation 600, and operation 950 can, for example, correspond to an embodiment of operations 610-630.

Operation 960 can include the wireless communication device 202 performing reselection to a new cell, such as second cell 206. UL communication can be performed and/or resumed in the new cell following reselection.

The various aspects, embodiments, implementations or features of the described embodiments can be used separately or in any combination. Various aspects of the described embodiments can be implemented by software, hardware or a combination of hardware and software. The described embodiments can also be embodied as a computer readable medium (or mediums) storing computer readable code including instructions that can be performed by one or more computing devices. The computer readable medium may be associated with any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code may be stored and executed in a distributed fashion.

In the foregoing detailed description, reference was made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments. For example, it will be appreciated that the ordering of operations illustrated in the flowcharts is non-limiting, such that the ordering of two or more operations illustrated in and described with respect to a flowchart can be changed in accordance with some example embodiments. As another example, it will be appreciated that in some embodiments, one or more operations illustrated in and described with respect to a flowchart can be optional, and can be omitted.

Further, the foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. The description of and examples disclosed with respect to the embodiments presented in the foregoing description are provided solely to add context and aid in the understanding of the described embodiments. The description is not intended to be exhaustive or to limit the described embodiments to the precise forms disclosed. It will be apparent to one of ordinary skill in the art that many modifications, alternative applications, and variations are possible in view of the above teachings. In this regard, one of ordinary skill in the art will readily appreciate that the described embodiments may be practiced without some or all of these specific details. Further, in some instances, well known process steps have not been described in detail in order to avoid unnecessarily obscuring the described embodiments.

What is claimed is:

1. A method for triggering cell transition in an uplink (UL) power limited condition, the method comprising:
   by a wireless communication device:
   measuring a downlink (DL) channel quality for signals received from a serving cell;
   estimating an UL channel quality based on one or more of: an UL block error rate (BLER), a number of UL radio link control (RLC) retransmission (ReTX) failures, or a number of random access channel (RACH) failures;
   determining that the wireless communication device is experiencing the UL power limited condition in which there is a link imbalance between the estimated UL channel quality and the measured DL channel quality, wherein the measured DL channel quality suffices to not trigger a measurement report to cause a cell transition from the serving cell to a second cell;
   deriving a modified DL channel quality measurement by adjusting the measured DL channel quality to indicate a lower DL channel quality than the measured DL channel quality in response to the UL power limited condition, wherein the modified DL channel quality is based at least in part on a measurement event reporting threshold set by the serving cell and to cause the serving cell to trigger transition of the wireless communication device from the serving cell to the second cell;
   generating a modified measurement report including the modified DL channel quality measurement; and
   sending the modified measurement report to the serving cell to cause the serving cell to trigger transition of the wireless communication device from the serving cell to the second cell.

2. The method of claim 1, wherein determining that the wireless communication device is experiencing the UL power limited condition comprises determining that the UL BLER exceeds a threshold BLER for observed DL conditions.

3. The method of claim 1, wherein determining that the wireless communication device is experiencing the UL power limited condition comprises determining that available power headroom (PHR) is less than a threshold PHR.

4. The method of claim 1, wherein determining that the wireless communication device is experiencing the UL power limited condition comprises determining that the wireless communication device has experienced a threshold number of UL RLC ReTX failures.

5. The method of claim 1, wherein determining that the wireless communication device is experiencing the UL power limited condition comprises determining that the wireless communication device has performed a threshold number of failed RACH attempts using a maximum transmission power when in connected mode, the method further comprising the wireless communication device:
   entering an out of service (OOS) state;
   performing a cell search, the second cell being identified in the cell search; and
   reselecting to the second cell.

6. The method of claim 1, wherein determining that the wireless communication device is experiencing the UL power limited condition comprises determining that the wireless communication device has performed a threshold number of failed RACH attempts when in idle mode, the method further comprising the wireless communication device:
   reselecting to the second cell.

7. The method of claim 1, wherein deriving the modified DL channel quality measurement comprises deriving a modified reference signal received power (RSRP) measurement.

8. The method of claim 1, wherein deriving the modified DL channel quality measurement comprises applying an offset to a filtered DL channel quality measurement derived from a plurality of DL channel quality measurements.

9. The method of claim 1, wherein determining that the wireless communication device is experiencing the UL power limited condition comprises determining that the UL channel quality is less than a threshold UL channel quality defined to enable the wireless communication device to successfully send measurement reports to the serving cell.

10. The method of claim 1, wherein the serving cell uses a first radio access technology (RAT) and the second cell uses a second RAT, and wherein transition of the wireless communication device from the serving cell to the second cell comprises an inter-RAT (IRAT) transition.

11. A wireless communication device comprising:
at least one transceiver configured to transmit data to and receive data from a cellular network; and
processing circuitry coupled with the at least one transceiver and configured to control the wireless communication device to at least:
measure a downlink (DL) channel quality for signals received from a serving cell;
estimate an uplink (UL) channel quality based on one or more of: an UL block error rate (BLER), a number of UL radio link control (RLC) retransmission (ReTX) failures, or a number of random access channel (RACH) failures;
determine that the wireless communication device is experiencing an UL power limited condition in which there is a link imbalance between the estimated UL channel quality and the measured DL channel quality, wherein the measured DL channel quality suffices to not trigger a measurement report to cause a cell transition from the serving cell to a second cell;
derive a modified DL channel quality measurement by adjusting the measured DL channel quality to indicate a lower DL channel quality than the measured DL channel quality in response to the UL power limited condition, wherein the modified DL channel quality is based at least in part on a measurement event reporting threshold set by the serving cell and to cause the serving cell to trigger transition of the wireless communication device from the serving cell to the second cell;
generate a modified measurement report including the modified DL channel quality measurement; and
send the modified measurement report to the serving cell to cause the serving cell to trigger transition of the wireless communication device from the serving cell to the second cell.

12. The wireless communication device of claim 11, wherein the processing circuitry is further configured to control the wireless communication device to determine that the wireless communication device is experiencing the UL power limited condition based at least in part on an observed UL error rate.

13. The wireless communication device of claim 11, wherein the processing circuitry is further configured to control the wireless communication device to determine that the wireless communication device is experiencing the UL power limited condition based at least in part on a power headroom (PHR) available to the wireless communication device.

14. The wireless communication device of claim 11, wherein the processing circuitry is further configured to control the wireless communication device to determine that the wireless communication device is experiencing the UL power limited condition in response to the wireless communication device experiencing a threshold number of UL RLC ReTX failures.

15. The wireless communication device of claim 11, wherein the processing circuitry is further configured to control the wireless communication device to determine that the wireless communication device is experiencing the UL power limited condition in response to the wireless communication device performing a threshold number of failed RACH attempts using a maximum transmission power when in connected mode.

16. The wireless communication device of claim 11, wherein the processing circuitry is further configured to control the wireless communication device to determine that the wireless communication device is experiencing the UL power limited condition in response to the wireless communication device performing a threshold number of failed RACH attempts when in idle mode.

17. The wireless communication device of claim 11, wherein the modified DL channel quality measurement is a modified reference signal received power (RSRP) measurement.

18. The wireless communication device of claim 11, wherein the serving cell uses a first radio access technology (RAT) and the second cell uses a second RAT, and wherein transition of the wireless communication device from the serving cell to the second cell comprises an inter-RAT (IRAT) transition.

19. A computer program product for triggering cell transition in an uplink (UL) power limited condition, the computer program product comprising at least one non-transitory computer readable storage medium having computer program code stored thereon, the computer program code comprising program code, which, when executed by one or more processors implemented on a wireless communication device, is configured to cause the wireless communication device to perform a method comprising:
measuring a downlink (DL) channel quality for signals received from a serving cell;
estimating an UL channel quality based on one or more of: an UL block error rate (BLER), a number of UL radio link control (RLC) retransmission (ReTX) failures, or a number of random access channel (RACH) failures;
determining that the wireless communication device is experiencing the UL power limited condition in which there is a link imbalance between the estimated UL channel quality and the measured DL channel quality, wherein the measured DL channel quality suffices to not trigger a measurement report to cause a cell transition from the serving cell to a second cell;
deriving a modified DL channel quality measurement by adjusting the measured DL channel quality to indicate a lower DL channel quality than the measured DL channel quality in response to the UL power limited condition, wherein the modified DL channel quality is based at least in part on a measurement event reporting threshold set by the serving cell and to cause the serving cell to trigger transition of the wireless communication device from the serving cell to the second cell;
generating a modified measurement report including the modified DL channel quality measurement; and
sending the modified measurement report to the serving cell to cause the serving cell to trigger transition of the wireless communication device from the serving cell to the second cell.

20. The computer program product of claim 19, wherein the serving cell implements a Long Term Evolution (LTE) radio access technology (RAT), and wherein the modified DL channel quality measurement is a modified reference signal received power (RSRP) measurement.

* * * * *